(12) United States Patent
Keller et al.

(10) Patent No.: US 9,429,021 B2
(45) Date of Patent: Aug. 30, 2016

(54) METHOD FOR WELDING ROTORS FOR POWER GENERATION

(71) Applicant: ALSTOM Technology Ltd, Baden (CH)

(72) Inventors: Sorin Keller, Oberrohrdorf (CH); Werner Martin Balbach, Wuerelingen (CH); Claus Paul Gerdes, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 340 days.

(21) Appl. No.: 14/230,147

(22) Filed: Mar. 31, 2014

(65) Prior Publication Data
US 2014/0299581 A1    Oct. 9, 2014

(30) Foreign Application Priority Data
Apr. 4, 2013    (EP) .................................... 13162323

(51) Int. Cl.
| | | |
|---|---|---|
| *B23K 9/00* | (2006.01) | |
| *B23K 9/02* | (2006.01) | |
| *B23K 31/00* | (2006.01) | |
| *B23K 33/00* | (2006.01) | |
| *F01D 5/06* | (2006.01) | |
| *B23K 9/028* | (2006.01) | |
| *B23K 9/167* | (2006.01) | |
| *B23K 9/173* | (2006.01) | |
| *B23K 15/00* | (2006.01) | |
| *B23K 26/28* | (2014.01) | |
| *B23K 9/16* | (2006.01) | |

(Continued)

(52) U.S. Cl.
CPC .................. *F01D 5/063* (2013.01); *B23K 9/00* (2013.01); *B23K 9/028* (2013.01); *B23K 9/0213* (2013.01); *B23K 9/16* (2013.01); *B23K 9/167* (2013.01); *B23K 9/173* (2013.01); *B23K 10/02* (2013.01); *B23K 15/0046* (2013.01); *B23K 15/0053* (2013.01); *B23K 20/1205* (2013.01); *B23K 20/129* (2013.01); *B23K 26/20* (2013.01); *B23K 26/28* (2013.01); *B23K 33/006* (2013.01); *B23K 2201/001* (2013.01); *F01D 5/025* (2013.01)

(58) Field of Classification Search
CPC .......... B23K 9/00; B23K 9/02; B23K 31/00; B23K 33/00
USPC ............. 219/121.11, 121.14, 121.64, 137 R; 228/112.1, 175; 29/596, 598; 416/213 R, 213 A
See application file for complete search history.

(56) References Cited

U.S. PATENT DOCUMENTS

| | | | |
|---|---|---|---|
| 4,213,025 A | | 7/1980 | Kuhnen |
| 5,532,454 A | * | 7/1996 | Kuhnen ............... B23K 33/004 219/125.11 |

(Continued)

FOREIGN PATENT DOCUMENTS

| | | |
|---|---|---|
| CN | 102049616 A | 5/2011 |
| EP | 0 665 079 | 8/1995 |

(Continued)

*Primary Examiner* — Samuel M Heinrich
(74) *Attorney, Agent, or Firm* — Buchanan Ingersoll & Rooney PC

(57) ABSTRACT

The invention relates to a method for welding rotors for power generation such as gas turbines, steam turbines, and generators having a plurality of rotor discs arranged along a rotor axis. The method includes providing said discs with a weld seam preparation. The weld seam preparation includes a root, a first, gap-like welding section adjoining the root in radial direction, and a second, gap-like welding section adjoining the first welding section in radial direction. The method further includes melting the root by means of a first welding process; making a weld in the first welding section by means of a second welding process; and filling up the second welding section by means of a third welding process.

7 Claims, 2 Drawing Sheets

(51) Int. Cl.
  *B23K 10/02* (2006.01)
  *B23K 20/12* (2006.01)
  *B23K 26/20* (2014.01)
  *F01D 5/02* (2006.01)

(56) References Cited

U.S. PATENT DOCUMENTS

| 6,324,831 | B1 | 12/2001 | Izadi et al. | |
|---|---|---|---|---|
| 8,533,948 | B2 * | 9/2013 | Keller | B23K 9/0026 148/539 |
| 2006/0118528 | A1 | 6/2006 | De Dinechin et al. | |

FOREIGN PATENT DOCUMENTS

| EP | 2226146 | 8/2010 |
|---|---|---|
| JP | H09-52183 | 2/1997 |
| JP | 2002-001557 | 1/2002 |
| JP | 2005-349430 | 12/2005 |
| JP | 2008-215181 | 9/2008 |
| JP | 2011-161459 | 8/2011 |
| WO | 2009/065739 | 5/2009 |
| WO | 2010/142726 | 12/2010 |
| WO | 2012/041677 | 4/2012 |
| WO | 2012/076750 | 6/2012 |

* cited by examiner

Fig.1  *Prior Art*

METHOD FOR WELDING ROTORS FOR POWER GENERATION

CROSS-REFERENCE TO RELATED APPLICATIONS

This application claims priority to European application 13162323.3 filed Apr. 4, 2013, the contents of which are hereby incorporated in its entirety.

TECHNICAL FIELD

The present invention relates to the technology of turbomachines. It refers to a method for welding rotors for power generation according to the preamble of claim 1.

BACKGROUND

In the prior art, the forged and NDT (Non-Destructive Testing) tested discs are machined for weld seam preparation. Afterwards the discs are stapled on top of each other and their run-out relative to each other and as a whole is checked and if necessary adjusted. Now, with the discs in vertical position the root of the weld is melted without weld filler using Tungsten Inert Gas welding (TIG). After this the weld height in radial direction is increased to allow tilting of the rotor in horizontal position using very narrow gap TIG with parent metal weld filler (reinforcement layers to allow tilting of the rotor). After tilting the rotor in horizontal position, the welding is finalized, filling the weld using Submerged Arc Welding (SAW). Finally the welds of the rotor are NDT checked using US (ultrasonic) testing.

The prior art welding of rotors for power generation equipment is described in more details with EP 0 665 079 A1 and EP 2 215 329 A1.

Documents EP 0 665 079 A1 and EP 2 215 329 A1 (resp. WO 2009/065739 A1) describe the principles for welding rotors for power generation (gas turbines, steam turbines, generators), which comprise a plurality of rotor discs arranged along a rotor axis, thereby using TIG welding, especially very narrow gap TIG for the root area of the welding joint, and afterwards Submerged Arc Welding (SAW) to fill the weld seam.

FIG. 1 (similar to EP 0 665 079 A1) shows a prior art welding joint with a welding seam 13 between two adjacent rotor discs 11 and 12 of a welded rotor 10. Before welding the two discs 11 and 12 abut with a centering step joint 20 of height h, thereby creating an extreme narrow gap 19, which is defined by extreme narrow gap component faces 23 and 24 of the discs 11 and 12, and a narrow gap 14, which is defined by narrow gap component faces 15 and 16 of the discs 11 and 12.

The extreme narrow gap 19 is filled with TIG welding seams 25, each welding seam extending over the full extreme narrow gap width b. The narrow gap 14 is filled with SAW welding seams 17, 18, which are smaller than the narrow gap width a and are alternating butt against the opposing narrow gap component faces 15 and 16, and overlap in the middle of the narrow gap 14. During TIG welding a fusing area 22 at the root of the welding joint is fused. Furthermore, a relieving ridge 21 with a relieving ridge width c and height d and relieving ridge angle a is provided at the root of the welding joint.

The extreme narrow gap TIG weld (welding seams 25) are welded typically in a vertical stack of rotor discs (see for example FIG. 2 of WO 2009/065739 A1) and the subsequently filled SAW weld (SAW welding seams 17, 18) is filled in horizontal position (see for example FIG. 3 of WO 2009/065739 A1). The TIG-SAW transition is shown with a U type weld joint preparation for the SAW area.

The typical dimensions of such a prior art welding joint are:

Typical width of TIG extreme narrow gap: b=10 mm.
Typical width of SAW narrow gap: a=17 mm.

Document EP 0 665 079 A1 discloses a method, which concerns joining of metal components by arc fusion welding which produces a low-volume seam made up of weld beads applied alternating to the component flanks according to the process specified in DE 26 33 829 A1. In addition to a normal gap, the components are provided with an adjoining end gap and a centering insert. The components are positioned with the aid of this insert, a relief swelling is formed in the region of the seam bottom, and a required through-fusion position is produced by the welding process. Subsequently the component flanks are joined by fully automatic TIG welding or MPG welding produces multi-layered weld beads whose width covers the entire width b of the end gap.

Document EP 2 215 329 A1 or WO 2009/065739 A1, respectively, relates to a method for producing a rotor made by welding together disc and/or drum-shaped elements, particularly discs, wherein said discs are assembled in sequence along a longitudinal axis by means of a device and welded in a two-stage welding process. The discs are stacked axially in the vertical direction during assembly. A first welding process takes place in a vertical orientation of the stacked discs, followed by a second welding process in a horizontal orientation of the stacked discs.

Nowadays, in the field of welded rotors for turbomachines, there are other powerful weld procedures available, which could replace Tungsten Inert Gas (TIG) welding for the melting of the root and the filling of the reinforcement layers with high quality and reduced cost.

Metal Active Gas (MAG) fully automatic process is a powerful process to replace the Submerged Arc Welding (SAW) process for filling up the weld after root melting and welding of the reinforcement layer. MAG welding can also be applied in vertical position if necessary. In this case no reinforcement layers to allow tilting before SAW welding would be necessary, but immediately after melting of the root area, the weld can be filled in vertical position by MAG.

SUMMARY

It is an object of the present invention to disclose a method for manufacturing a welded rotor for a turbomachine, which is more flexible and easier to execute.

This object is obtained by a method according to claim 1.

The method according to the invention for welding rotors for power generation (gas turbines, steam turbines, generators), which comprise a plurality of rotor discs arranged along a rotor axis, comprises the steps of:
  providing said discs with a weld seam preparation, said weld seam preparation comprising a root, a first, gap-like welding section adjoining said root in radial direction, and a second, gap-like welding section adjoining said first welding section in radial direction;
  melting the root by means of a first welding process;
  making a reinforcement weld in said first welding section by means of a second welding process; and
  filling up said second welding section by means of a third welding process.

It is characterized in that said first welding process is one of Laser Welding (LW), Electron Beam welding (EB), friction welding and laser hybrid welding and/or the second welding process is one of Laser Welding or laser hybrid welding.

According to an embodiment of the invention said first welding process is one of Laser Welding (LW), Electron Beam welding (EB), friction welding and laser hybrid welding, and the said second welding process is Tungsten Inert Gas welding (TIG). According to another embodiment of the invention said second welding process is Laser Welding or laser hybrid welding and said first welding process is Tungsten Inert Gas welding (TIG).

According to another embodiment of the invention said third welding process is fully automatic Metal Active Gas welding (MAG).

According to a further embodiment of the invention said third welding process is Cold Metal Transfer welding (CMT).

According to an additional embodiment of the invention said third welding process is laser hybrid welding.

According to just another embodiment of the invention said second welding process is Laser Welding (LW), and that this process is done with powder or wire filler metal.

BRIEF DESCRIPTION OF THE DRAWINGS

The present invention is now to be explained more closely by means of different embodiments and with reference to the attached drawings.

DETAILED DESCRIPTION

The general idea of the present invention is to replace the TIG welding process and/or SAW welding process in the prior art manufacturing process of a welded rotor of a turbomachine at least partially by one or more advantageous welding processes to simplify the procedure and/or make the procedure more flexible.

Figure 2:
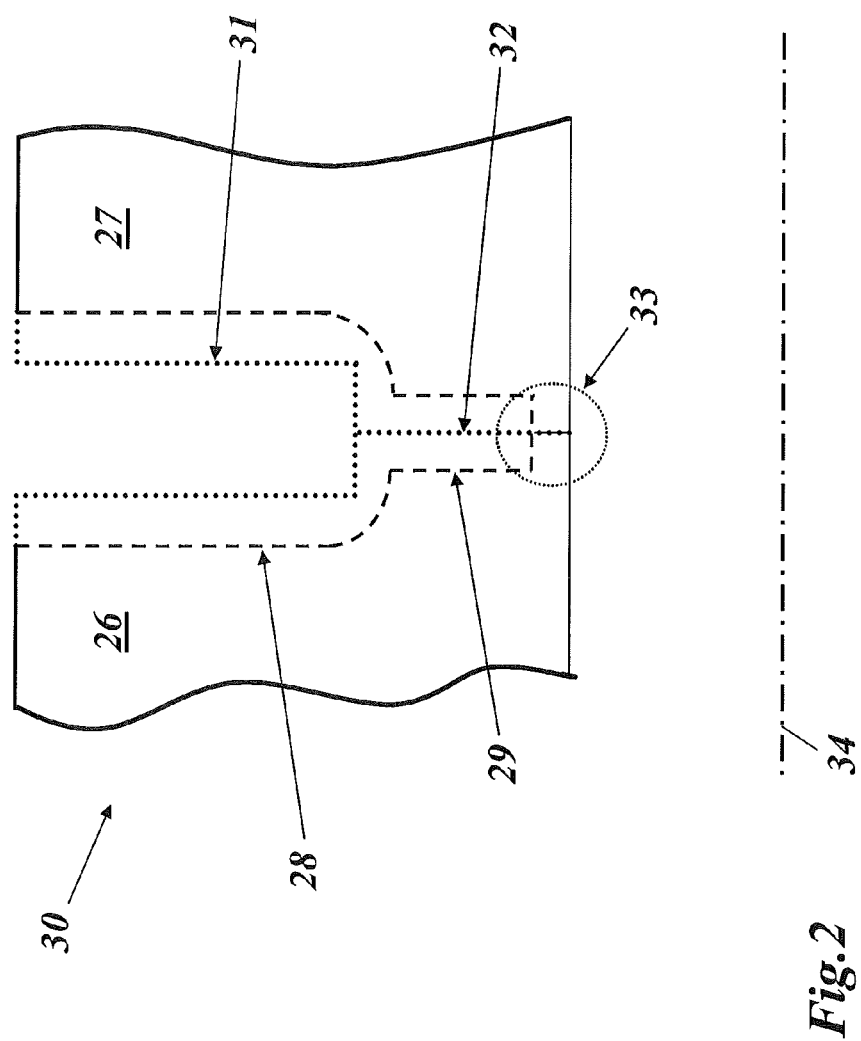
FIG. 2 shows a comparison between a welding joint configuration as used in FIG. 1 and according to an embodiment of the invention.

As shown in FIG. 2, the welding joint configuration between two adjacent discs 26 and 27 of a rotor 30 with a rotor axis 34 comprises different sections, namely a root 33, a first welding section 32 (replacing the TIG welding area 29 of the prior art) and an adjoining second welding section 31 (replacing the SAW welding area 28 of the prior art).

A first embodiment of the invention relates to the replacement of TIG welding for root 33 and reinforcement (in welding section 32) before filling the seam (in welding section 31) using SAW by:

Laser Welding (LW) for melting the root 33 and making reinforcement layers (in welding section 32) with powder or wire filler metal;

Electron Beam welding (EB) for melting root 33 and reinforcement layers (in welding section 32);

Friction welding, linear or by rotation, instead of melting root 33 and filling reinforcement layers (in welding section 32);

Laser hybrid welding for melting root 33 and filling reinforcement layers (in welding section 32);

A combination of the procedures above with each other and/or with TIG welding for melting the root 33 or for the reinforcement layers (in welding section 32).

A second embodiment of the invention relates to the replacement of SAW welding for filling up the weld (in welding section 31) by using a fully automatic Metal Active Gas (MAG) welding process.

Thus, the TIG melting of the root 33 and the additional welding with filler metal of the reinforcement layers (in welding section 32) can be done by other nowadays available and proven weld procedures as:

Laser Welding (LW);
Electron Beam welding (EB);
Friction welding, especially linear friction welding
Laser hybrid welding
Combinations of the above and with TIG The filler metal used may be wire or powder.

Depending on rotor details in the prior art up to four TIG burners are used in parallel for the welding. For the above mentioned alternative weld procedures multiple burners can be used in parallel in the same way, depending on the rotor geometry.

MAG welding may replace SAW filling of the weld (in welding section 31) in horizontal position of the rotor after the root melting and the reinforcement layer welding, but can also be used in vertical position of the rotor instead of SAW welding and without the reinforcement layer (in welding section 32) necessary to tilt the rotor safely from vertical to horizontal position for SAW welding. SAW welding in vertical position is possible, but complicated and therefore typically not used.

Thus, depending on the individual application, TIG welding currently used in combination with SAW welding for power generation rotor welding can be replaced by the above mentioned alternative welding procedures, their combinations and in combination with TIG for melting or for the reinforcement layers.

Thus, MAG welding can be used instead of SAW welding to finalize the rotor welds, either in horizontal position, as commonly used for SAW, but also in vertical position, with the possibility not to apply the reinforcement layers.

Another embodiment of the invention relates to the replacement of SAW welding for filling up the weld (in welding section 31) by using a cold metal transfer (CMT) welding process.

Figure 1:
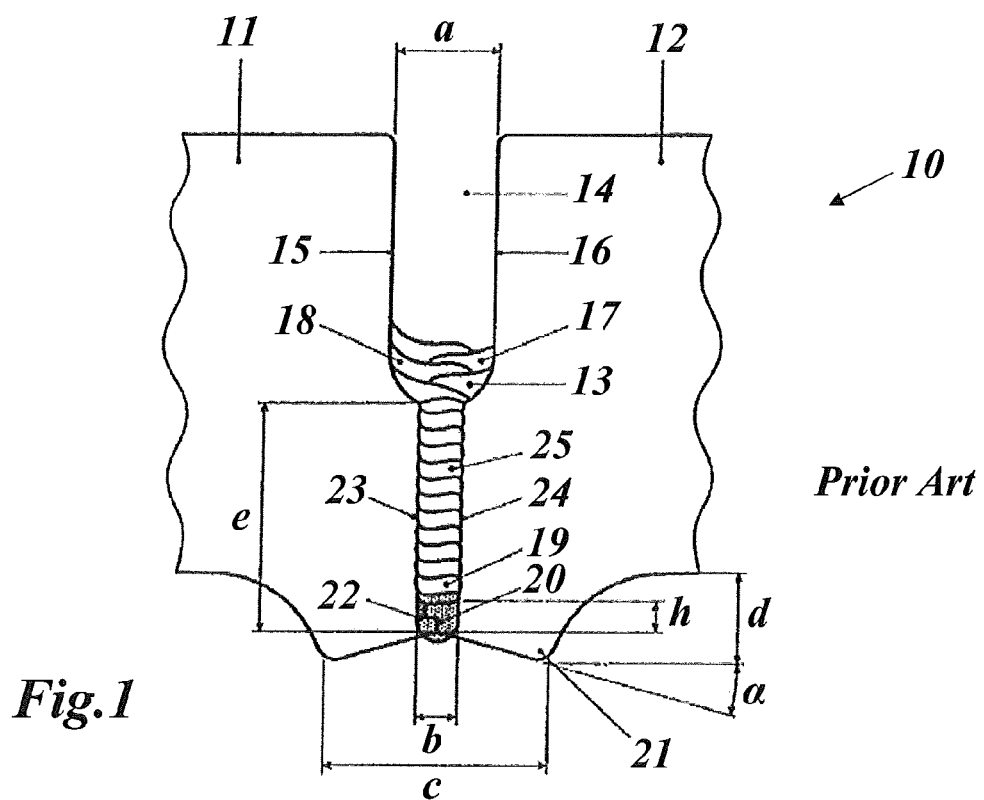
FIG. 1 shows a welding joint between rotor discs according to the prior art.

Advantages of the Laser Welding (LW) for root 33 and reinforcement welding (in welding section 32) in vertical position are:

No reinforcement welding necessary, as LW instead of TIG welding allows a weld thickness sufficient to replace the second reinforcement welding;

No weld filler necessary for root welding (TIG replacement);

Less complicated root weld area preparation, as no very narrow gap TIG welding (see FIG. 1) necessary any more;

Laser Welding (LW) is easier than TIG welding;

Laser Welding (LW) is less sensible to magnetic fields than TIG or EB welding;

Laser Welding (LW) does not require vacuum (in comparison to EB welding).

Advantages of Electron Beam welding (EB) for root 33 in vertical position are:

No reinforcement welding necessary, as EB welding instead of TIG welding allows a weld thickness sufficient to replace reinforcement welding;

No weld filler necessary for root welding (TIG replacement).

Advantages of laser hybrid welding for root 33 and welding (in welding section 32) in vertical position are:
- No reinforcement welding necessary, as laser hybrid welding instead of TIG welding allows a weld thickness sufficient to replace TIG root and TIG reinforcement welding;
- No change of weld process necessary for filling up the weld, as laser hybrid can also be used instead of SAW in welding section 31.

Advantages of replacement of SAW welding by other weld process for filling up the weld seam (in welding section 31) are:
- No necessity to weld in horizontal position, different to SAW welding;
- No welding flux necessary;

Advantages of replacement of SAW welding by laser hybrid welding process for filling up the weld seam (in welding section 31) are:
- No shift of rotor 30 to horizontal welding facility necessary;
- No welding flux necessary;
- Reduction of weld width possible (especially for large weld depth) compared to SAW welding;
- Less weld filler necessary (in volume), less weld shrinkage;
- Same process is possible for root welding and filling the weld seam (in welding section 31).

Advantages of replacement of SAW welding by MAG welding process for filling up the weld seam (in welding section 31) are:
- No shift of rotor 30 to horizontal welding facility necessary;
- No welding flux necessary;
- Same or better melting rate with flux cored wire as with SAW welding;
- Reduction of weld width compared to SAW possible (especially for large weld depth).

Advantages of replacement of SAW welding by Cold Metal Transfer (CMT) welding process for filling up the weld seam (in welding section 31) are:
- No shift of rotor 30 to horizontal welding facility necessary;
- No welding flux necessary;
- Reduction of weld width compared to SAW possible (especially for large weld depth);
- Reduced heat input into base material compared to MAG welding.

The invention claimed is:

1. A method for welding rotors for power generation which comprise a plurality of rotor discs arranged along a rotor axis, said method comprising:
   providing said discs with a weld seam preparation, said weld seam preparation comprising a root, a first, gap-like welding section adjoining said root in radial direction, and a second, gap-like welding section adjoining said first welding section in radial direction;
   melting the root by means of a first welding process;
   making a weld in said first welding section by means of a second welding process; and
   filling up said second welding section by means of a third welding process wherein;
   said first welding process is one of Laser Welding (LW), Electron Beam welding (EB), friction welding and laser hybrid welding and/or
   said second welding process is one of Laser Welding (LW) and laser hybrid welding.

2. The method as claimed in claim 1, wherein the first welding process is one of Laser Welding (LW), Electron Beam welding (EB), friction welding and laser hybrid welding, and that the second welding process is Tungsten Inert Gas welding (TIG).

3. The method as claimed in claim 1, wherein the second welding process is one of Laser Welding and laser hybrid welding and that first welding process is Tungsten Inert Gas welding (TIG).

4. The method as claimed in claim 1, wherein said third welding process is fully automatic Metal Active Gas welding (MAG).

5. The method as claimed in claim 1, wherein said third welding process is Cold Metal Transfer welding (CMT).

6. The method as claimed in claim 1, wherein said third welding process is laser hybrid welding.

7. The method as claimed in claim 1, wherein said second welding process is Laser Welding (LW), and that this process is done with powder or wire filler metal.

* * * * *